(12) United States Patent
Okada et al.

(10) Patent No.: US 8,999,585 B2
(45) Date of Patent: Apr. 7, 2015

(54) NONAQUEOUS ELECTROLYTE SECONDARY BATTERY

(75) Inventors: Yukihiro Okada, Osaka (JP); Yoshiyuki Muraoka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1317 days.

(21) Appl. No.: 12/175,878

(22) Filed: Jul. 18, 2008

(65) Prior Publication Data

US 2009/0023073 A1  Jan. 22, 2009

(30) Foreign Application Priority Data

Jul. 18, 2007  (JP) ................. 2007-186589
Jul. 8, 2008   (JP) ................. 2008-177608

(51) Int. Cl.
| | | |
|---|---|---|
| *H01M 2/16* | (2006.01) | |
| *H01M 10/0525* | (2010.01) | |
| *H01M 2/14* | (2006.01) | |
| *H01M 4/13* | (2010.01) | |
| *H01M 4/62* | (2006.01) | |
| H01M 10/052 | (2010.01) | |
| H01M 4/139 | (2010.01) | |

(52) U.S. Cl.
CPC ........ *H01M 10/0525* (2013.01); *H01M 2/1646* (2013.01); *H01M 10/052* (2013.01); *H01M 2/145* (2013.01); *H01M 2/166* (2013.01); *H01M 2/1673* (2013.01); *H01M 4/13* (2013.01); *H01M 4/139* (2013.01); *H01M 4/62* (2013.01); *H01M 4/625* (2013.01); *Y02E 60/122* (2013.01); *Y02T 10/7011* (2013.01)

(58) Field of Classification Search
CPC ... H01M 2/1646; H01M 2/14; H01M 10/052; H01M 2004/027; H01M 2004/028; H01M 2/166; H01M 2/1673; H01M 10/0525; Y02E 60/122
USPC .......................... 429/246, 247, 251
See application file for complete search history.

(56) References Cited

U.S. PATENT DOCUMENTS

| | | | |
|---|---|---|---|
| 6,627,346 | B1 | 9/2003 | Kinouchi et al. |
| 7,560,193 | B2 * | 7/2009 | Ikuta et al. ............ 429/246 |
| 2002/0006552 | A1 | 1/2002 | Ishida et al. |
| 2006/0105245 | A1 | 5/2006 | Ikuta et al. |

FOREIGN PATENT DOCUMENTS

| | | |
|---|---|---|
| JP | 09-132846 | 5/1997 |
| JP | 10-162811 | 6/1998 |
| JP | 10-255842 | 9/1998 |
| JP | 2000-243381 | 9/2000 |
| JP | 2001-135317 | 5/2001 |
| JP | 2002-025531 | 1/2002 |
| JP | 2003-297431 | 10/2003 |
| JP | 2005-71979 | 3/2005 |
| JP | 2006-172777 | 6/2006 |
| JP | 2007-012496 | 1/2007 |
| JP | 2007-042601 | 2/2007 |
| WO | WO 2005/124899 A1 | 12/2005 |

OTHER PUBLICATIONS

Japanese Office Action, with English translation, issued in Japanese Patent Application No. 2008-177608 mailed Oct. 27, 2009.

* cited by examiner

*Primary Examiner* — Laura Weiner (74) *Attorney, Agent, or Firm* — McDermott Will & Emery LLP (57) ABSTRACT

A nonaqueous electrolyte secondary battery includes a positive electrode, a negative electrode, a porous insulating layer, and nonaqueous electrolyte. The porous insulating layer is interposed between the positive electrode and the negative electrode. The nonaqueous electrolyte is contained at least in the porous insulating layer. The mixture layer of the positive electrode and the porous insulating layer each include a structure retainer.

3 Claims, 3 Drawing Sheets

NONAQUEOUS ELECTROLYTE SECONDARY BATTERY

BACKGROUND OF THE INVENTION

1. Field of the Invention

The present invention relates to a nonaqueous electrolyte secondary battery.

2. Description of the Prior Art

In recent years, shift of electronic devices into portable and cordless forms has been explosive, and accordingly, demands for compact, light-weighted, high energy density secondary batteries for use as a battery for driving such electronic devices have been increasing. Meanwhile, it has been proposed that a secondary battery is used not only for compact consumer devices but also for a power source for a device which need to have long-term durability, such as a power source for power storage, a power source for electric vehicles, etc. Broadening of the technical fields to which secondary batteries are applicable has been acceleratedly advancing.

Among various secondary batteries, nonaqueous electrolyte secondary batteries, especially, lithium ion secondary batteries, achieve higher voltages and higher energy densities. Therefore, the nonaqueous electrolyte secondary batteries have been expected for use as a power source for electronic devices, a power source for power storage, or a power source for electric vehicles.

The nonaqueous electrolyte secondary battery includes a positive electrode, a negative electrode, a separator, and nonaqueous electrolyte. The separator is interposed between the positive electrode and the negative electrode. The separator is mainly formed by a polyolefin microporous membrane. The nonaqueous electrolyte is contained at least in the separator. The nonaqueous electrolyte is liquid nonaqueous electrolyte prepared by dissolving lithium salt, such as $LiBF_4$ or $LiPF_6$, into an aprotic organic solvent. Nonaqueous electrolyte secondary batteries have been turned into practical uses, wherein the active material of the positive electrode is an active material which is high in potential relative to lithium and in which lithium ions are electrochemically intercalatable and deintercalatable (for example, $LiCoO_2$, $LiNiO_2$, $LiMn_2O_4$, $LiFePO_4$) while the active material of the negative electrode is any of various carbon materials, such as graphite, or a metal oxide.

In such a nonaqueous electrolyte secondary battery, during charging operation, lithium ions from the active material of the positive electrode are intercalated between the crystal layers of the active material of the negative electrode, while during discharging operation, the lithium ions residing between the crystal layers of the active material of the negative electrode return to the active material of the positive electrode. Thus, charging and discharging of the nonaqueous electrolyte secondary battery cause the active material of the positive electrode and the active material of the negative electrode to expand or contract.

Specifically, the active material of the positive electrode releases lithium ions during charging operation and regains the lithium ions during discharging operation. Herein, the active material of the positive electrode exists in the form of a lithium oxide, a lithium phosphate, or a lithium sulfate. The crystal structure of the lithium oxide, the lithium phosphate, or the lithium sulfate has a robust framework, such as a layered rock-salt structure, a spinel structure, or an olivine structure. Therefore, expansion and contraction of the active material of the positive electrode due to intercalation and deintercalation of lithium are very small.

On the other hand, in the active material of the negative electrode, lithium ion is intercalated between the crystal layers of the active material of the negative electrode during charging operation so that the space between the crystal layers is expanded. Therefore, the charging operation causes the active material of the negative electrode to expand. In the case where an alloy is used as the active material of the negative electrode, the expansion of the active material of the negative electrode is very large.

When the active material of the negative electrode expands, there is a probability that the positive electrode and the separator are compressed. When the positive electrode and the separator are compressed, voids that exist in a mixture layer of the positive electrode and in the separator are collapsed. Since the voids contain the nonaqueous electrolyte, the collapse of the voids causes the nonaqueous electrolyte to be expelled out of the voids. As a result, as the cycles of charging/discharging are repeated over and over, the battery capacity can decrease (the cycle characteristics can deteriorate). Therefore, it is preferable to prevent expansion of the active material of the negative electrode during charging operation.

For the purpose of ameliorating the decrease in capacity which could occur along with repeated charging/discharging cycles, it has been proposed to mix Vapor Grown Carbon Fibers (VGCF) into the negative electrode (see Japanese Laid-Open Patent Publication No. 10-162811; hereinafter, this publication is referred to as "Document 1"). Document 1 describes that the vapor grown carbon fibers compensate for expansion and compression of the active material of the negative electrode to prevent deformation of the negative electrode. As a result, the decrease in capacity which could occur along with repeated charging/discharging cycles can be prevented.

SUMMARY OF THE INVENTION

However, even when the technique disclosed in Document 1 is used, it is difficult to completely prevent expansion of the active material of the negative electrode. Accordingly, as described above, expansion of the active material of the negative electrode causes the separator and the positive electrode to be compressed, so that the voids exist in the separator and in the mixture layer of the positive electrode are collapsed. As a result, there is a probability that the nonaqueous electrolyte contained in the voids is expelled out of the voids. Thus, the technique disclosed in Document 1 still has the disadvantage of deteriorating the cycle characteristics.

In the circumstances where higher capacity is demanded of the nonaqueous electrolyte secondary batteries, an active material which achieves higher capacity than carbon materials, such as alloys, metal oxides, or Si oxides, is also demanded as the active material of the negative electrode. When using such a high capacity active material, more lithium ions can be intercalated between the crystal layers of the active material of the negative electrode as compared with an example where a carbon material, such as graphite, is used as the active material. Accordingly, the expansion rate during charging operation increases. Therefore, even the technique disclosed in Document 1 cannot sufficiently prevent the expansion of the active material of the negative electrode in some cases.

Recently, a negative electrode wherein the active material of the negative electrode is vacuum-deposited over the surface of the current collector of the negative electrode has been studied. In this negative electrode, it is difficult to use the method disclosed in Document 1.

In view of such circumstances, an objective of the present invention is to solve such problems by providing a nonaqueous electrolyte secondary battery having excellent cycle characteristics.

Specifically, a nonaqueous electrolyte secondary battery of the present invention includes a positive electrode, a negative electrode, a porous insulating layer, and nonaqueous electrolyte. The positive electrode has a mixture layer containing an active material in which lithium ions are electrochemically intercalatable and deintercalatable. The negative electrode has a layer containing an active material in which lithium ions are electrochemically intercalatable and deintercalatable (hereinafter, referred to as "the active material layer of the negative electrode"). The porous insulating layer is interposed between the positive electrode and the negative electrode. The nonaqueous electrolyte is contained at least in the porous insulating layer. The mixture layer of the positive electrode includes a structure retainer. The porous insulating layer includes a structure retainer or is formed by a structure retainer.

In a nonaqueous electrolyte secondary battery of the present invention, the porous insulating layer and the mixture layer of the positive electrode include a structure retainer. Therefore, even when the active material of the negative electrode is stimulated to expand, the expansion of the active material is prevented. Namely, the separator and the positive electrode are prevented from being compressed by the expanded negative electrode. Thus, the nonaqueous electrolyte is prevented from being expelled out of the voids that exist in the separator and in the mixture layer of the positive electrode, so that deterioration in cycle characteristics can be prevented.

BRIEF DESCRIPTION OF THE DRAWINGS

FIG. 1A shows an example where none of the structure retainer and the expansion inhibitor is provided. FIG. 1B shows an example where only the expansion inhibitor is provided in the active material layer of the negative electrode. FIG. 1C shows an example where the structure retainer is provided in both the mixture layer of the positive electrode and the porous insulating layer.

DESCRIPTION OF THE PREFERRED EMBODIMENTS

Hereinafter, embodiments of the present invention are described in detail with reference to the drawings. It should be noted that the present invention is not limited to the embodiments presented below.

A nonaqueous electrolyte secondary battery of this embodiment includes a positive electrode, a negative electrode, a porous insulating layer, and nonaqueous electrolyte. The positive electrode has a mixture layer on one side of a current collector or mixture layers on both sides of the current collector. The mixture layer of the positive electrode contains an active material in which lithium ions are electrochemically intercalatable and deintercalatable, a binder, and a conductor. The negative electrode has an active material layer(s) containing the active material on one side or both sides of the current collector. The active material of the negative electrode is a material in which lithium ions are electrochemically intercalatable and deintercalatable. The porous insulating layer is interposed between the positive electrode and the negative electrode. The nonaqueous electrolyte is contained in the positive electrode, the negative electrode and the separator. The mixture layer of the positive electrode and the porous insulating layer each include a structure retainer.

In the nonaqueous electrolyte secondary battery having such a structure, the mixture layer of the positive electrode and the porous insulating layer each include a structure retainer. Therefore, even when the active material of the negative electrode expands during charging operation, deformation of the positive electrode and the porous insulating layer is prevented. As a result, even if the active material of the negative electrode expands, the nonaqueous electrolyte can be prevented from being expelled from the voids of the mixture layer of the positive electrode and the porous insulating layer, so that the deterioration in cycle characteristics can be prevented.

Figure 1A:
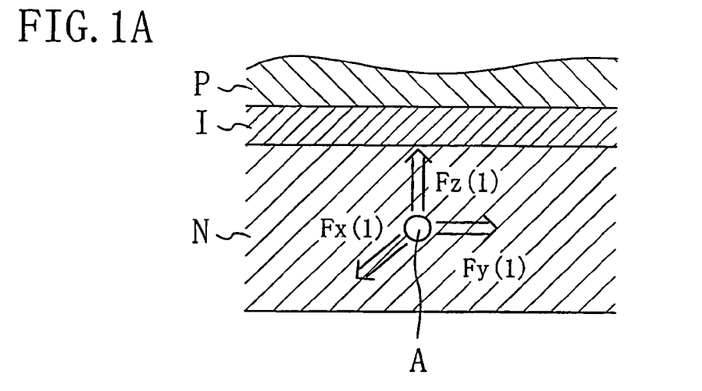
FIG. 1A to FIG. 1C schematically illustrate the compressive force produced by expansion of the active material of the negative electrode during charging operation.
Figure 1B:
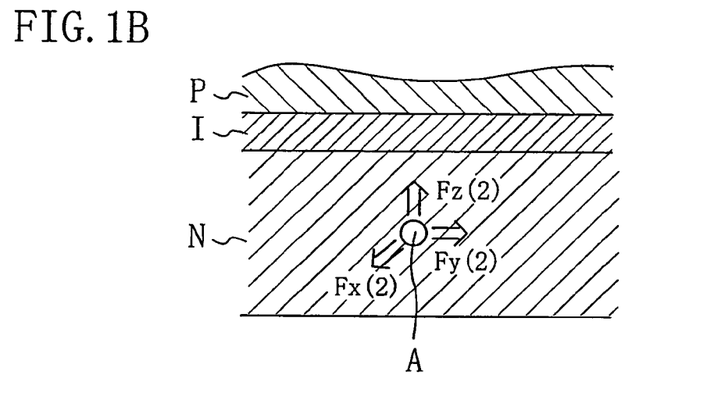
Figure 1C:
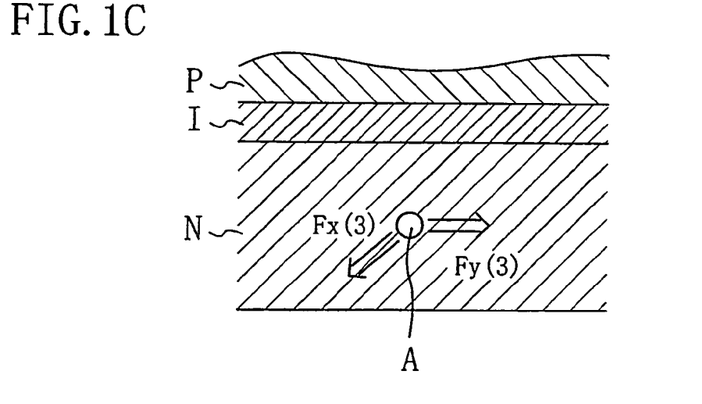

The structure retainer is now described with reference to FIG. 1A to FIG. 1C. FIG. 1A to FIG. 1C schematically illustrate compressive force (the force that compresses the positive electrode or the porous insulating layer) which is produced as a result of expansion of the active material A of the negative electrode by charging operation. FIG. 1A shows an example where none of an expansion inhibitor for inhibiting expansion of the active material A of the negative electrode and the structure retainer is provided. FIG. 1B shows an example where an expansion inhibitor is provided in the active material layer N of the negative electrode while no structure retainer is provided. FIG. 1C shows an example where no expansion inhibitor is provided while the structure retainers are provided in the mixture layer P of the positive electrode and the porous insulating layer I. In FIG. 1A to FIG. 1C, "Fx", "Fy" and "Fz" denote the magnitude of compressive forces in x-direction, y-direction and z-direction, respectively. The x-direction is a direction perpendicular to the surface of the sheet of the drawing. The y-direction is a lateral direction across the sheet of the drawing. The z-direction is a vertical direction across the sheet of the drawing.

Herein, the expansion inhibitor is, as disclosed in Document 1, a material which isotropically inhibits expansion of the active material of the negative electrode. The structure retainer is a material which prevents expansion of the active material of the negative electrode in the thickness direction of the active material layer of the negative electrode.

In general, when charging the nonaqueous electrolyte secondary battery, lithium ions from the active material of the positive electrode are intercalated between the crystal layers of the active material of the negative electrode, resulting in expansion of the active material of the negative electrode.

In the absence of the inhibitor and structure retainer, the active material A of the negative electrode isotropically expands as shown in FIG. 1A. Thus, $Fx(1) \approx Fy(1) \approx Fz(1)$. Since the active material A of the negative electrode expands in the z-direction (the thickness direction of the active material layer of the negative electrode) as shown in FIG. 1A, compressive force ($Fz(1) \neq 0$) works on the separator I and the positive electrode, so that the mixture layer P of the positive electrode and the separator I are compressed. As a result of the compression, the voids of the mixture layer P of the positive electrode and the separator I for containing the nonaqueous electrolyte collapse, so that the nonaqueous electrolyte is expelled out of the voids.

In the example described in Document 1 where the expansion inhibitor is contained in the active material layer N of the negative electrode, as shown in FIG. 1B, the expansion inhibitor (not shown) isotropically inhibits expansion of the active material A of the negative electrode. Therefore, $Fx(2) \approx Fy(2) \approx Fz(2) \neq 0$, though $Fx(2)<Fx(1)$, $Fy(2)<Fy(1)$, and $Fz(2)<Fz(1)$. Thus, it is difficult to inhibit the compression of the mixture layer P of the positive electrode and the separator I.

In an example of the nonaqueous electrolyte secondary battery of the present embodiment where the mixture layer P of the positive electrode and the porous insulating layer I include the structure retainers (not shown), even when compressive force is applied to the mixture layer P and the porous insulating layer I of the positive electrode, the retaining force for retaining the structure of the mixture layer P of the positive electrode and the porous insulating layer I works on the negative electrode against the compressive force. Since the retaining force is transmitted from the mixture layer P of the positive electrode and the porous insulating layer I to the negative electrode in this way, expansion of the active material A of the negative electrode in the z-direction is prevented as shown in FIG. 1C ($Fz(3) \approx 0$). As a result, the mixture layer P of the positive electrode and the porous insulating layer I are prevented from being compressed. Accordingly, the voids included in the mixture layer P of the positive electrode and in the porous insulating layer I are prevented from collapsing, so that the nonaqueous electrolyte is prevented from being expelled out of the voids. Thus, deterioration in cycle characteristics can be prevented.

Even when the expansion in the z-direction is thus prevented, the active material of the negative electrode expands in the x- and y-directions during charging operation such that the voids of the active material layer of the negative electrode are collapsed ($Fx(3) \neq 0$, $Fy(3) \neq 0$). Thus, in the nonaqueous electrolyte secondary battery of this embodiment, collapse of the mixture layer of the positive electrode and the separator can be prevented without deteriorating the charging characteristics.

The expansion inhibitor of Document 1 isotropically inhibits the expansion of the active material A of the negative electrode. Therefore, in the example of FIG. 1B, namely, in the case where the expansion inhibitor is included in the active material layer N of the negative electrode as described in Document 1, complete inhibition of the expansion of the active material A of the negative electrode hinders lithium ions entering between the crystal layers of the active material A of the negative electrode during charging operation, resulting in a probability of deterioration in charging characteristics.

Preferably, the structure retainer is also included in the active material layer of the negative electrode. This prevents expansion of the active material of the negative electrode, so that compression of the mixture layer of the positive electrode and the porous insulating layer is further prevented.

In summary, according to this embodiment, the structure retainer is included in the mixture layer of the positive electrode and in the porous insulating layer and, preferably, also included in the active material layer of the negative electrode. With the structure retainer included in the mixture layer of the positive electrode and the porous insulating layer, the structure of the mixture layer of the positive electrode and the porous insulating layer is retained. As a result, the expansion of the active material of the negative electrode in the thickness direction of the active material layer of the negative electrode is prevented. Therefore, in the mixture layer of the positive electrode and the porous insulating layer, the structure retainer functions as a compression-resistant component. On the other hand, when the structure retainer is included in the active material layer of the negative electrode, expansion of the active material of the negative electrode is prevented. In other words, the structure retainer in the active material layer of the negative electrode functions as an expansion-resistant component.

The structure retainer is preferably included in both the mixture layer of the positive electrode and the porous insulating layer. This is because, if the structure retainer is only included in the mixture layer of the positive electrode, the compressive force produced by the expansion of the active material of the negative electrode concentrates on the porous insulating layer, so that the porous insulating layer is compressed in some cases. Likewise, if the structure retainer is only included in the porous insulating layer, the compressive force produced by the expansion of the active material of the negative electrode concentrates on the mixture layer, so that the mixture layer of the positive electrode is compressed in some cases.

The shape of the structure retainer is preferably determined such that the structure retainer solely is unlikely to cause occlusion in the voids, i.e., such that the tap density is small. The shape of the structure retainer is preferably, for example, a shape with a high aspect ratio, a shape of tangled threads, a shape of a twig or tetrapod. Since the structure retainers are entangled with one another, the compression resistance of the mixture layer of the positive electrode and the porous insulating layer can be improved. Further, the expansion-resistivity of the active material layer of the negative electrode can be improved. Specific examples are described below.

The structure retainer included in the porous insulating layer is preferably ceramic granules. The ceramic granules are unlikely to be deformed even with application of external force and can therefore improve the compression resistance of the porous insulating layer. Also, the ceramic granules have excellent insulation properties so that insulation can be secured between the positive electrode and the negative electrode.

The shape of the ceramic granule is preferably the shape of a twig. With the shape of a twig, the ceramic granules are entangled with one another so that the compression resistance of the porous insulating layer is further improved as compared with, for example, spherical ceramic granules.

Herein, the porous insulating layer may include the structure retainer or may be formed by the structure retainer. The porous insulating layer formed by the structure retainer includes not only an arrangement where the porous insulating layer is formed only by the structure retainer but also an arrangement where the structure retainers are adhesively combined together. For example, if the structure retainers are ceramic granules as mentioned above, the porous insulating layer may be formed by the ceramic granules and an adhesive resin, polyethylene, polypropylene, or polyimide. Alternatively, the porous insulating layer may be formed by a plurality of ceramic granules adhered together.

The structure retainer included in the mixture layer of the positive electrode may be ceramic granules having the shape of twigs or may be carbon fiber. With the ceramic granules having the shape of twigs, the ceramic granules are entangled with one another as described above so that the compression resistance of the mixture layer of the positive electrode can be improved. Note that the present inventors confirmed that the power characteristics of the battery can be secured even if the ceramic granules are included in the mixture layer of the positive electrode although the ceramic granules are insulative. We are uncertain of the reason but estimate that the ceramic granules included in the mixture layer of the positive electrode improve the compression resistance of the mixture layer of the positive electrode, so that passageways of the nonaqueous electrolyte can be secured in the mixture layer of the positive electrode.

When using carbon fibers, the carbon fibers are entangled with one another so that the compression resistance of the mixture layer of the positive electrode can be improved. The carbon fiber is excellent in electric conductivity so that the conductivity of the mixture layer of the positive electrode can be secured.

The structure retainer included in the active material layer of the negative electrode is preferably carbon fiber. The carbon fibers entangled with one another can prevent expansion of the active material of the negative electrode.

Specific material examples of the structure retainer are described below.

When the ceramic granules are included as the structure retainer in the porous insulating layer and in the mixture layer of the positive electrode, the ceramic granules used are a single species of metal oxide, metal nitride or metal carbonate, or a combination of such materials. Among the metal oxide, metal nitride and metal carbonate, the use of metal oxide is preferable because of, for example, higher availability. Examples of the metal oxide include alumina (aluminum oxide), titania (titanium oxide), zirconia (zirconium oxide), magnesia (magnesium oxide), zinc oxide, and silica (silicon oxide). Among these examples of the metal oxide, alumina is preferable, and α-alumina is more preferable. α-alumina is chemically stable, and α-alumina with high purity is chemically very stable. "Chemically stable" means, for example, that it is not corroded by the nonaqueous electrolyte even if it comes in contact with the nonaqueous electrolyte, that it is not decomposed or brought into reaction even if an oxidation-reduction potential is applied to the positive electrode and the negative electrode, and that a side reaction does not occur which would cause an adverse effect on the battery characteristics.

Figure 2:
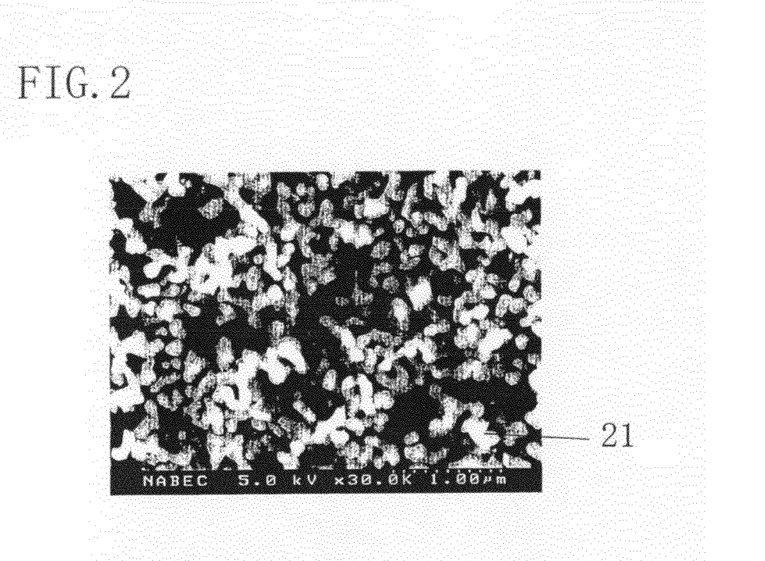
FIG. 2 is a scanning electron microscopic image of ceramic granules in the shape of twigs.

Preferably, the ceramic granules have the average monocrystalline grain size of about 0.05 μm to 1 μm. The shape of the ceramic granule may be a sphere formed by general primary particles aggregated by van der Waals force, but desirably be a shape having an engagement portion by which monocrystalline cores are engaged with one another as shown in FIG. 2. FIG. 2 shows that grown monocrystalline cores of the ceramic granules are engaged together. A polycrystalline grain 21 is not spherical but generally has bumps, upheavals, or bulges, and preferably has the shape of a twig, a staghorn or a cluster. The ceramic granule preferably has a neck in the engagement portion for engaging monocrystalline cores together (see FIG. 2). However, even a granule whose neck is not clearly identified can be used.

Such ceramic granules containing polycrystalline grains are produced through the step of baking a ceramic precursor to obtain ceramic chips and the step of mechanically shredding the ceramic chips into granules. The ceramic chips have a structure of grown monocrystalline cores that are three-dimensionally linked together. Such ceramic chips are mechanically and properly shredded to obtain ceramic granules containing polycrystalline grains. The ceramic granules are preferably formed by polycrystalline grains but may contain another type of grains, for example, spherical or substantially spherical primary particles, or spherical grains formed by primary particles aggregated by van der Waals force, at the ratio of, for example, less than 30% by weight.

The porous insulating layer is preferably formed by the ceramic granules and the binder. In this case, the binder may be, for example, a fluorine resin. Examples of the fluorine resin include PolyVinylidene Fluoride (PVDF), polytetrafluoroethylene (PTFE) and tetrafluoroethylene-hexafluoropropylene copolymer (FEP; Fluorinated-Ethylene-Propylene). The binder may be a polyacrylic acid derivative or a polyacrylonitrile derivative. The polyacrylic acid derivative and the polyacrylonitrile derivative include, in addition to an acrylic acid unit and an acrylonitrile unit, any one of the group consisting of a methyl acrylate unit, an ethyl acrylate unit, a methyl methacrylate unit and an ethyl methacrylate unit. The binder may be polyethylene or styrene-butadiene rubber. The binder may be any one of these materials solely used or may be a combination of two or more of these materials. Among these materials, a polymer containing an acrylonitrile unit, i.e., a polyacrylonitrile derivative, is especially preferable. With any of these materials used as the binder, the porous insulating layer can be more flexible so that occurrence of cracks in the porous insulating layer can be prevented, and the porous insulating layer can be prevented from peeling off the positive electrode or the negative electrode.

The void ratio in the porous insulating layer is preferably 30% to 80%, more preferably 40% to 80%, more preferably 50% to 80%. The porous insulating layer preferably has the void ratio of 30% or more, especially 40% or more, because deterioration in the charge/discharge characteristics due to a large current flowed in the battery and deterioration in the charge/discharge characteristics in a low-temperature environment can be prevented. However, the void ratio higher than 80% is not preferable because the mechanical strength of the porous insulating layer is low.

An example where the mixture layer of the positive electrode contains carbon fiber as the structure retainer is now described. Examples of the carbon fiber include vapor grown carbon fiber (VGCF), carbon fiber, and carbon nanotube. The vapor grown carbon fiber is generally in an aggregated form, and therefore, this aggregate of carbon fiber is used as the structure retainer. The aggregate is formed by aggregated vapor grown carbon fibers each having a fiber diameter of 0.01 to 5 μm, wherein some of contacts of the vapor grown carbon fibers are chemically adhered by a carbide of an organic compound, such as tar, pitch, or the like, to form a floc or bobble having the diameter of 5 to 500 μm. The inside of the aggregate includes very small voids of different sizes. Such aggregate can be prepared using any one of the following methods. The first method includes first compressing vapor grown carbon fibers with a fiber diameter of 0.05 to 5 μm to form a molded element with the bulk density of 0.02 g/cm$^3$ or more, and then heating the molded element to 600° C., preferably 800° C. or higher, and shredding the heated molded element. The second method includes heating vapor grown carbon fibers to 600° C. or higher, preferably 800° C. or higher, while compressing the fibers with the pressure of 0.1 kg/cm$^2$ or more, and then shredding the heated molded element (see Japanese Laid-Open Patent Publication No. 9-132846). The vapor grown carbon fibers are not limited to any particular type but may be, for example, filaments with no branching, or may be fibers with branching, or may be combination of filaments and fibers with branching, but are preferably coarse fibers as produced, i.e., thermally untreated. The coarse carbon fibers have about 5 to 20 percents by weight of tar or pitch adsorbed thereon. The tar or pitch functions as a binder for binding carbon fibers when the carbon fibers are compressed, and is readily carbonized when heated to adhere carbon fibers together. When using thermally-treated vapor grown carbon fibers, the carbon fibers may desirably be molded with addition of pitch, or the like.

Preferably, such carbon fibers are also included in the active material layer of the negative electrode as described above.

Hereinafter, the structures of the positive electrode, the negative electrode and the nonaqueous electrolyte are described in this order.

As described above, the positive electrode includes mixture layers on both sides of the current collector of the positive electrode or includes a mixture layer on one side of the current collector. The mixture layers of the positive electrode contain an active material for the positive electrode in which at least lithium ions are electrochemically intercalatable and deintercalatable, a binder, a conductor, and a structure retainer.

Examples of the active material in which lithium ions are electrochemically intercalatable and deintercalatable includes oxides, phosphates, sulfates, and silicates that contain lithium and any metal element other than lithium. The any metal element other than lithium may be one element or may be one or more elements. Specifically, preferable examples of the active material in which lithium ions are electrochemically intercalatable and deintercalatable includes lithium cobaltate ($LiCoO_2$), denatured lithium cobaltate, lithium nickelate ($LiNiO_2$), denatured lithium nickelate, lithium manganate ($LiMn_2O_4$), denatured lithium manganate, lithium iron phosphate ($LiFePO_4$), denatured lithium iron phosphate, lithium manganese phosphate ($LiMnPO_4$), denatured lithium manganese phosphate, and lithium iron sulfate ($LiFeSO_4$). The active material of the positive electrode may be any of the aforementioned compounds in which part of Co, Ni, Mn or Fe is replaced by another transition metal element or main group metal element (e.g., aluminum or magnesium).

The binder of the positive electrode is not limited to any particular type of material but may be polytetrafluoroethylene (PTFE), denatured PTFE, PVDF, denatured PVDF, or denatured acrylonitrile rubber particles. When using PTFE or denatured acrylonitrile rubber particle binder (for example, BM-500B manufactured by ZEON Corporation) as the binder, carboxymethylcellulose (CMC), polyethylene oxide (PEO), or denatured acrylonitrile rubber is preferably used together as the thickener.

Examples of the conductor of the positive electrode include acetylene black, ketjen black, and various graphites. Any one of these examples may be solely used. Alternatively, two or more of these examples may be used in combination.

The current collector of the positive electrode preferably contains a stable metal which is not decomposed or molten even when a positive electrode potential is applied thereto. For example, the current collector may be realized by an aluminum foil or a film which has metal, such as aluminum, on the surface of the film. The current collector may have an undulated surface or may have bores.

The negative electrode has, as described above, the active material layers on both sides or one side of the current collector of the negative electrode. The active material layer of the negative electrode may contain the active material of the negative electrode and the binder. The active material layer of the negative electrode may further contain a thickener. The active material layer of the negative electrode may further contain a structure retainer.

The active material of the negative electrode is not limited to any particular material so long as it is capable of electrochemical intercalation and deintercalation of lithium ions. Specifically, examples of the active material of the negative electrode include various natural graphites, various artificial graphite, petroleum cokes, carbon fibers, carbon materials, such as baked organic polymers, metal oxides, silicon, silicon-containing composite materials (materials containing silicon and at least one element other than silicon), tin-containing composite materials (materials containing tin and at least one element other than tin), and various metals and alloys.

The binder of negative electrode is not limited to any particular type of material but is preferably rubber particles because even a small amount of rubber particles can achieve excellent binding property. Specifically, rubber particles containing a styrene group and a butadiene group are preferable. Examples of the binder include styrene-butadiene copolymer (SBR; styrene-butadiene rubber), denatured SBR, etc. In the case where rubber particles are used as the binder of the negative electrode, a thickener composed of a water-soluble polymer is desirably used together. The water-soluble polymer is preferably a cellulose resin, more preferably, CMC. Preferably, the amounts of the binder and the thickener in the active material layer of the negative electrode are each 0.1 to 5 parts by weight relative to 100 parts by weight of the active material of the negative electrode. Alternative examples of the binder include PVDF and denatured PVDF.

Alternatively, in the negative electrode, the active material may be precipitated over the surface of the current collector of the negative electrode using a vapor deposition method.

The current collector of the negative electrode preferably contains a stable metal which is not decomposed or molten even when a negative electrode potential is applied thereto. For example, the current collector may be realized by a copper foil or a film which has metal, such as copper, on the surface of the film. The current collector may have an undulated surface or may have bores.

The nonaqueous electrolyte is composed of an organic nonaqueous solvent and lithium salt dissolved therein. The concentration of the lithium salt is generally 0.5 to 2 mol/L.

The lithium salt is not limited to any particular type but is preferably lithium phosphate hexafluoride ($LiPF_6$), lithium perchlorate ($LiClO_4$), lithium fluoroborate ($LiBF_4$), or the like. As the lithium salt, any one of these examples may be solely used. Alternatively, two or more of these examples may be used in combination.

The organic nonaqueous solvent is not limited to any particular type. Preferable examples of the organic nonaqueous solvent, however, include: carbonic esters, such as ethylene carbonate (EC), propylene carbonate (PC), dimethyl carbonate (DMC), diethyl carbonate (DEC), ethyl methyl carbonate (EMC), and the like; carboxylate esters, such as γ-butyrolactone, γ-valerolactone, methyl formate, methyl acetate, methyl propionate, and the like; and ethers, such as dimethyl ether, diethyl ether, tetrahydrofuran, and the like. As the organic nonaqueous solvent, any one of these examples may be solely used. Alternatively, two or more of these examples may be used in combination. Among these examples, especially, carbonic esters are preferably used.

To form an excellent film over the electrode such that the stability is secured even when overcharged, adding Vinylene Carbonate (VC), cyclohexylbenzene (CHB), or denatured VC or CHB to the nonaqueous electrolyte is preferable.

Although it is described above that the mixture layer of the positive electrode preferably contains ceramic granules or carbon fibers as the structure retainer in this embodiment, the mixture layer of the positive electrode may contain both ceramic granules and carbon fibers.

Although the structure of an electrode assembly is not specifically described, the electrode assembly of this embodiment may be formed by rolling up the positive electrode and the negative electrode together with the porous insulating layer interposed therebetween. Alternatively, the electrode assembly may be formed by combining the positive electrode and the negative electrode into a laminate with the porous insulating layer interposed therebetween. When the positive electrode and the negative electrode are rolled up together, the shape of an end face of the resultant electrode assembly may be a circle or may be a flattened circle. In fabrication of such an electrode assembly, the porous insulating layer may be interposed between the positive electrode and the negative electrode when they are rolled up or combined into a laminate. Alternatively, paste containing the constituents of the porous insulating layer may be applied over a surface of the positive electrode or the negative electrode and dried before the positive electrode and the negative electrode are rolled up or combined into a laminate.

Although the nonaqueous electrolyte solution is described as an example of electrolyte, the aforementioned effects of the present invention can, as a matter of course, be achieved with a gel electrolyte.

Hereinafter, examples of the present invention are specifically described with reference to the drawings. It should be noted that the followings are merely examples of the present invention, to which the present invention is not limited.

Example 1

(I) Preparation of Ceramic Granules Containing Polycrystalline Grains

In connection with Example 1, we prepared ceramic granules containing α-alumina.

First, aluminum tributoxide (aluminum alkoxide) was prepared. The aluminum tributoxide was hydrolytically mixed in pure water to produce alumina gel which was then dried. The dried alumina gel was used as a ceramic precursor.

Then, the alumina gel (ceramic precursor) was baked at 1200° C. for 3 hours to produce baked α-alumina chips (baked ceramic chips). The resultant baked α-alumina chips were SEM (scanning electron microscope) photographed, and the average particle size of monocrystalline cores of α-alumina was determined from the SEM photographic image, which was about 0.2 μm.

The resultant baked α-alumina chips were shredded by a jet mill. The shredding conditions were set such that the bulk density of ceramic granules was 0.05 to 1.1 g/cm$^3$, and the BET specific surface was 3 to 22 m$^2$/g.

The bulk density of α-alumina was measured by a stationary method using "Powder Tester (trade name)" manufactured by Hosokawa Micron. The BET specific surface of α-alumina was measured using BET (Brunauer-Emmett-Teller) method. The resultant granules on the SEM image were observed and found to be polycrystalline particles in the shape of twigs.

(II) Preparation of Slurry Containing Constituents of Porous Insulating Layer

Into 100 parts by weight of polycrystalline alumina particles of a certain type, 4 parts by weight of polyacrylic acid derivative ("BM-720H (trade name)" manufactured by ZEON Corporation, as the binder) and an appropriate amount of N-methyl-2-pyrrolidone (hereinafter, NMP; N-methylpyrrolidone, as dispersion medium) were mixed to prepare slurry whose nonvolatile components were 60% by weight.

In this example, a mixture of the polycrystalline alumina particles, the binder, and the dispersion medium was stirred using a medialess disperser "CLEARMIX (trade name)" manufactured by M-technique Corporation. The mixture was stirred till the polycrystalline alumina particles and the binder were uniformly dispersed in the NMP to prepare slurry.

<a> Preparation of Positive Electrode 3 kg of lithium cobaltate (the active material of the positive electrode), 1 kg of "#1320 (trade name)" manufactured by KUREHA Corporation (NMP solution containing 12% by weight of PVDF, as the binder of the positive electrode), 90 g of acetylene black (conductor), 60 g of VGCF (structure retainer) manufactured by SHOWA DENKO K.K., and an appropriate amount of NMP were stirred using a twin arm kneader to prepare a mixture coating material for the positive electrode. Aluminum foil having a thickness of 15 μm (for the current collector of the positive electrode) was prepared and coated with the mixture coating material for the positive electrode to form a coating layer over the aluminum foil except for part of the foil to which a lead wire of the positive electrode was to be connected (connection portion for positive electrode lead wire). After dried, the dried coating layer was rolled using a roller. As a result, a mixture layer for the positive electrode was formed over the aluminum foil so that the density of the active material (=the weight of the active material/the volume of the mixture layer) was 3.3 g/cm$^3$. The formation of this structure was controlled such that the total of the thickness of the aluminum foil and the thickness of the mixture layer for the positive electrode (the thickness of the positive electrode) was 160 μm. Then, the resultant structure was cut so as to have a width insertable into a battery can of a cylindrical battery (product No. 18650) and rolled into a hoop for the positive electrode.

<b> Preparation of Negative Electrode 3 kg of artificial graphite (the active material of the negative electrode), 75 g of "BM-400B (trade name)" manufactured by ZEON Corporation (aqueous dispersion containing 40% by weight of denatured styrene-butadiene copolymer, as the binder), 30 g of CMC (thickener), and an appropriate quantity of water were stirred by a twin arm kneader to prepare a mixture coating material for the negative electrode. Copper foil having a thickness of 10 μm was prepared and coated with the mixture coating material for the positive electrode to form a coating layer over the copper foil except for part of the foil to which a lead wire of the negative electrode was to be connected (connection portion for negative electrode lead wire). After dried, the dried coating layer was rolled using a roller. As a result, the active material layer for the negative electrode was formed over the copper foil so that the density of the active material (=the weight of the active material/the volume of the active material layer) was 1.4 g/cm$^3$. The formation of this structure was controlled such that the total of the thickness of the copper foil and the thickness of the active material layer for the negative electrode (the thickness of the negative electrode) was 180 μm. Then, the resultant structure was cut so as to have a width insertable into a battery can of a cylindrical battery (product No. 18650) and rolled into a hoop for the negative electrode.

<c> Formation of Porous Insulating Layer

Slurry containing the constituents of the porous insulating layer was applied over the both sides of the hoop for the negative electrode using a gravure roll method at the rate of 0.5 m/min. Then, hot air at 120° C. was applied to the slurry with the flow rate of 0.5 m/sec for drying the slurry. As a result, the porous insulating layer having the thickness of 20 μm was formed on each side of the negative electrode.

<d> Preparation of Nonaqueous Electrolyte Solution

LiPF$_6$ was dissolved at the concentration of 1 mol/L in a nonaqueous solvent mixture containing EC, DMC and EMC at the volume ratio of 2:3:3 to prepare a nonaqueous electrolyte solution. Further, 2 parts by weight of VC was added to 100 parts by weight of the nonaqueous electrolyte solution.

<e> Fabrication of Battery

Figure 3:
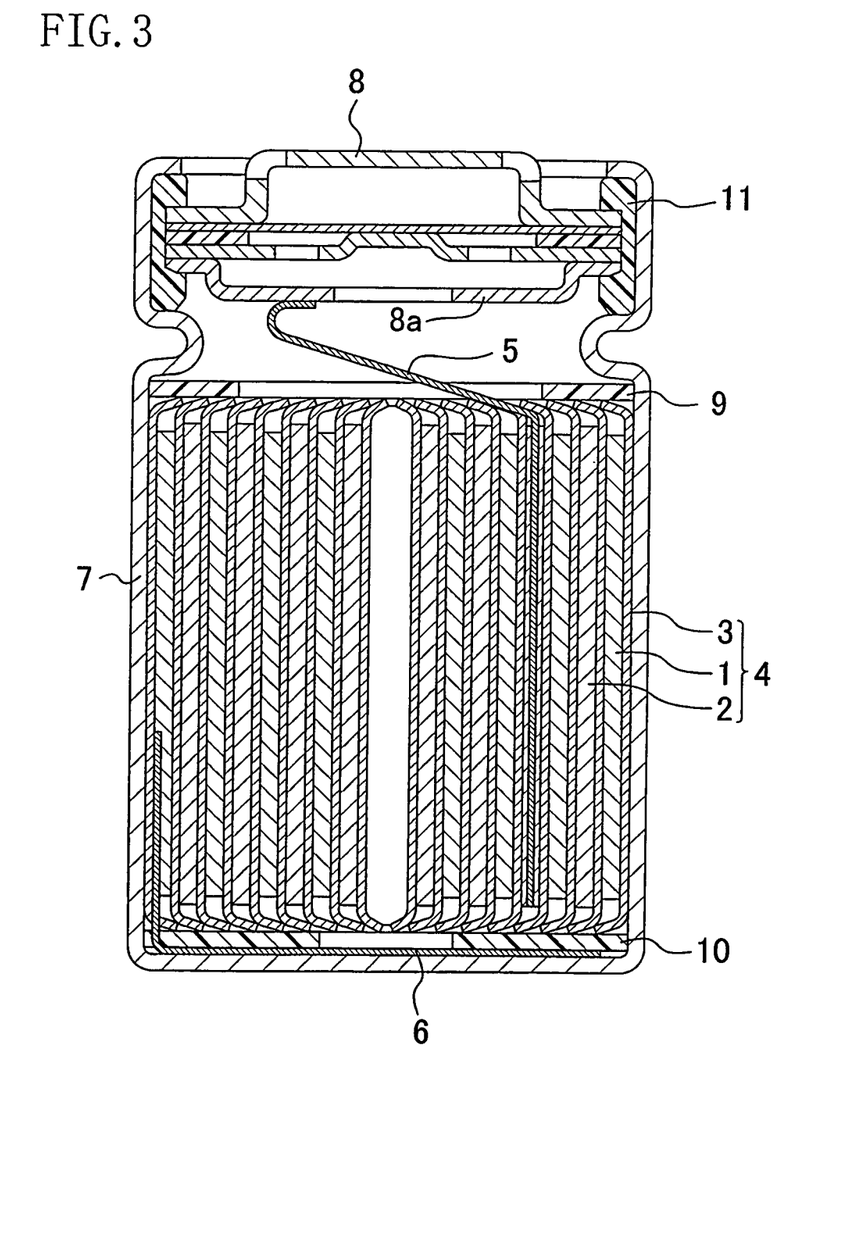
FIG. 3 shows a general vertical cross section of a nonaqueous electrolyte secondary battery.

A cylindrical battery of product No. 18650 was fabricated as described below using the positive electrode, the negative electrode and the nonaqueous electrolyte solution which are described above. FIG. 3 shows a general vertical cross section of the nonaqueous electrolyte secondary battery.

First, the positive electrode hoop and the negative electrode hoop with the porous insulating layers formed on both sides thereof were cut so as to have predetermined lengths to prepare a positive electrode plate 1 and a negative electrode plate 2 with porous insulating layers 3 formed on both sides thereof.

Then, an end of the positive electrode lead wire 5 was resistance-welded to the connection portion for positive electrode lead wire, and an end of the negative electrode lead wire 6 was resistance-welded to the connection portion for negative electrode lead wire. Thereafter, the positive electrode plate 1 and the negative electrode plate 2 were arranged such that the porous insulating layer 3 was sandwiched by the positive electrode plate 1 and the negative electrode plate 2, and the positive electrode plate 1 and the negative electrode plate 2 were rolled up to form a cylindrical electrode assembly 4. The thickness of the porous insulating layer 3 of the resultant electrode assembly 4 was 20 μm.

The negative electrode lead wire 6 was passed through a lower insulation ring 10 before the electrode assembly 4 was put into a metal closed-end case (battery case) 7. Then, the negative electrode lead wire 6 was resistance-welded to the bottom of the metal closed-end case 7 such that the negative electrode lead wire 6 was electrically connected to the closed-end case 7. An upper insulation ring 9 was placed on the top end face of the electrode assembly 4, and the positive electrode lead wire 5 was passed through the upper insulation ring 9. Then, a neck was formed in the vicinity of the open end of the metal closed-end case 7.

Subsequently, the positive electrode lead wire 5 was laser-welded to a metal filter 8a of a sealing plate 8 which has an outer gasket 11 made of a resin such that the positive electrode lead wire 5 was electrically connected to the sealing plate 8. Then, the nonaqueous electrolyte solution was poured into the metal closed-end case 7 via its open end, and the pressure inside the case 7 was decreased to 133 Pa so that the electrode assembly 4 was impregnated with the nonaqueous electrolyte solution.

Then, the positive electrode lead wire 5 was bent, and the sealing plate 8 that has the resin outer gasket 11 was attached to the neck of the closed-end case 7 and caulked to seal the open end of the closed-end case 7. In this way, a cylindrical nonaqueous electrolyte secondary battery A was fabricated.

Example 2

A nonaqueous electrolyte secondary battery B was fabricated, which was the same as the nonaqueous electrolyte secondary battery A of Example 1 except that VGCF was added as the structure retainer to the active material layer of the negative electrode. Specifically, 60 g of VGCF manufactured by SHOWA DENKO K.K. was added to the mixture coating material for the negative electrode of Example 1 to prepare the mixture coating material for the negative electrode of Example 2.

Example 3

A nonaqueous electrolyte secondary battery C was fabricated, which was the same as the nonaqueous electrolyte secondary battery A of Example 1 except that ceramic granules containing polycrystalline grains were used in the mixture layer of the positive electrode as the structure retainer instead of VGCF. Specifically, 60 g of ceramic granules prepared as described in the above section of Example 1, "(I) Preparation of Ceramic Granules containing Polycrystalline Grains", were added instead of 60 g of VGCF manufactured by SHOWA DENKO K.K. to prepare the mixture coating material for the positive electrode of Example 3.

Example 4

A nonaqueous electrolyte secondary battery D was fabricated, which was the same as the nonaqueous electrolyte secondary battery A of Example 1 except that alumina particles composed of spherical or generally spherical primary particles having the average particle size of 0.3 μm were used as a constituent of the porous insulating layer instead of the polycrystalline particles in the shape of twigs.

Comparative Example 1

A nonaqueous electrolyte secondary battery E was fabricated, which was the same as the nonaqueous electrolyte secondary battery A of Example 1 except that the structure retainer was not included in the mixture layer of the positive electrode and that a microporous membrane (the separator) made of a polyethylene resin was used instead of the porous insulating layer. The method for fabricating the battery E is described below.

<e> Fabrication of Battery

A cylindrical battery of product No. 18650 was fabricated as described below using the positive electrode, the negative electrode and the nonaqueous electrolyte solution which are described above.

First, the positive electrode and the negative electrode were cut so as to have predetermined lengths. Then, an end of the positive electrode lead wire was connected to the connection portion for positive electrode lead wire, and an end of the negative electrode lead wire was connected to the connection portion for negative electrode lead wire.

Then, the positive electrode and the negative electrode were rolled up with the microporous membrane made of a polyethylene resin having a thickness of 20 μm interposed therebetween to form a cylindrical electrode assembly.

Subsequently, a nonaqueous electrolyte secondary battery E was fabricated in the same way as Example 1.

Comparative Example 2

A nonaqueous electrolyte secondary battery F was fabricated, which was the same as the nonaqueous electrolyte secondary battery E of Comparative Example 1 except that VGCF was included as the structure retainer in the active material layer of the negative electrode. Namely, the negative electrode of Comparative Example 2 is the same as the negative electrode of Example 2.

Comparative Example 3

A nonaqueous electrolyte secondary battery G was fabricated, which was the same as the nonaqueous electrolyte secondary battery E of Comparative Example 1 except that VGCF was included as the structure retainer in the mixture layer of the positive electrode. Namely, the positive electrode of Comparative Example 3 is the same as the positive electrode of Example 1.

Comparative Example 4

A nonaqueous electrolyte secondary battery H was fabricated, which was the same as the nonaqueous electrolyte secondary battery A of Example 1 except that the structure retainer was not included in the mixture layer of the positive electrode, i.e., VGCF (structure retainer) manufactured by SHOWA DENKO K.K. was not included in the positive electrode. Namely, the positive electrode of Comparative Example 4 is the same as the positive electrode of Comparative Example 1.

Example 5

A nonaqueous electrolyte secondary battery I was fabricated, which was the same as the nonaqueous electrolyte secondary battery A of Example 1 except that Si was used as the active material of the negative electrode instead of the artificial graphite, that the porous insulating layers were formed on both sides of the positive electrode instead of the both sides of the negative electrode, and that the nonaqueous electrolyte solution was prepared without adding VC. Specifically, the negative electrode, the porous insulating layer, and the battery were fabricated according to fabrication methods described below.

<b> Fabrication of Negative Electrode

A single ingot of Si (manufactured by Kojundo Chemical Lab. Co., Ltd.; Purity 99.999%; Average particle size 5 to 35 mm) was put in a graphite crucible. This crucible was put in a vacuum deposition apparatus, and electron beam vacuum deposition (acceleration voltage: −8 kV, current: 150 mA, degree of vacuum: $3\times10^{-5}$ Torr) was performed on an electrolytically Cu-plated foil (manufactured by FURUKAWA CIRCUIT FOIL Co., Ltd.; thickness 20 µm; as the current collector of the negative electrode). After deposition of Si on one side of the electrolytically Cu-plated foil was completed, the vacuum deposition was also performed on the other side of the electrolytically Cu-plated foil (untreated surface) in the same way. Thereby, the active material layers of the negative electrode were formed on both sides of the electrolytically Cu-plated foil. Thereafter, the electrode plate was slit so as to have a width insertable into a battery can of a cylindrical battery (product No. 18650) and rolled into a hoop for the negative electrode.

<c> Formation of Porous Insulating Layer

Slurry containing the constituents of the porous insulating layer was applied over the both sides of the positive electrode hoop using a gravure roll method at the rate of 0.5 m/min. Then, hot air at 120° C. was applied to the slurry with the flow rate of 0.5 m/sec for drying the slurry. As a result, the porous insulating layer having the thickness of 20 µm was formed on each side of the positive electrode.

Comparative Example 5

A nonaqueous electrolyte secondary battery J was fabricated, which was the same as the nonaqueous electrolyte secondary battery I of Example 5 except that a microporous membrane made of a polyethylene resin was used instead of the porous insulating layer. Specifically, the positive electrode was fabricated in the same way as Example 1, the negative electrode was fabricated in the same way as Example 5, and the battery was fabricated in the same way as Comparative Example 1.

Example 6

A nonaqueous electrolyte secondary battery K was fabricated, which was the same as the nonaqueous electrolyte secondary battery B of Example 2 except that a microporous membrane made of a polyethylene resin and containing alumina particles was used instead of the porous insulating layer of Example 2. The polyethylene resin microporous membrane containing alumina particles was prepared using a method disclosed in Japanese Laid-Open Patent Publication No. 2005-71979. A method for fabricating the battery K is described below.

<e> Fabrication of Battery

A cylindrical battery of product No. 18650 was fabricated through a procedure described below using the positive electrode, the negative electrode and the nonaqueous electrolyte solution which are described above. First, the positive electrode and the negative electrode were cut so as to have predetermined lengths. Then, an end of the positive electrode lead wire was connected to the connection portion for positive electrode lead wire, and an end of the negative electrode lead wire was connected to the connection portion for negative electrode lead wire. Then, the positive electrode and the negative electrode were rolled up with a polyethylene resin microporous membrane, having a thickness of 20 µm and containing ceramic granules, interposed therebetween to form a cylindrical electrode assembly. Subsequently, the nonaqueous electrolyte secondary battery K was fabricated in the same way as Example 1.

For the nonaqueous electrolyte secondary batteries A to D, I and K of the Examples and the nonaqueous electrolyte secondary batteries E to H and J of the Comparative Examples, the number of cycles was measured according to a procedure described below.

Each battery was subjected to preparatory charging/discharging operation twice. After that, the battery was charged and stored in an environment at 45° C. for 7 days. Subsequently, the battery was subjected to the charging/discharging cycle described below in an environment at 20° C.

<Cycle Conditions>

A current of 1000 mA was flowed to charge the battery till the voltage of the battery reached 4.2 V (constant current charging). During the next 1 minute, the battery was left alone. Then, a current of 1000 mA was flowed to discharge the battery till the voltage of the battery reached 3.0 V (constant current discharging). During the next 1 minute, the battery was left alone.

The results of measurement of the number of cycles is shown in Table 1. It should be noted that the "Number of Cycles" in Table 1 refers to the number of cycles that elapsed before the discharge capacity decreased below 80% of the initial discharge capacity.

TABLE 1

| | Structure Retainer | | | | Active Material of | |
|---|---|---|---|---|---|---|
| | Positive Electrode | Negative Electrode | Porous Insulating Layer | Porous Insulating Layer | Negative Electrode | Number of Cycles |
| Example 1 (Battery A) | VGCF | none | α-alumina/ shape of twigs | α-alumina/ shape of twigs | artificial graphite | 460 |
| Example 2 (Battery B) | VGCF | VGCF | α-alumina/ shape of twigs | α-alumina/ shape of twigs | artificial graphite | 540 |
| Example 3 (Battery C) | α-alumina/ shape of twigs | none | α-alumina/ shape of twigs | α-alumina/ shape of twigs | artificial graphite | 500 |
| Example 4 (Battery D) | VGCF | none | α-alumina/ primary particles | α-alumina/ primary particles | artificial graphite | 360 |
| Comparative Example 1 (Battery E) | None | none | none | none (polyethylene separator) | artificial graphite | 220 |
| Comparative Example 2 (Battery F) | None | VGCF | none | none (polyethylene separator) | artificial graphite | 260 |
| Comparative Example 3 (Battery G) | VGCF | none | none | none (polyethylene separator) | artificial graphite | 180 |
| Comparative Example 4 (Battery H) | None | none | α-alumina/ shape of twigs | α-alumina/ shape of twigs | artificial graphite | 240 |
| Example 5 (Battery I) | VGCF | none | α-alumina/ shape of twigs | α-alumina/ shape of twigs | Si | 160 |
| Comparative Example 5 (Battery J) | VGCF | none | none | none (polyethylene separator) | Si | 60 |
| Example 6 (Battery K) | VGCF | VGCF | α-alumina | α-alumina (in polyethylene separator) | artificial graphite | 500 |

Comparing the measurement results of the nonaqueous electrolyte secondary batteries A to H and K, the nonaqueous electrolyte secondary batteries A to D and K of the Examples achieved greater numbers of cycles than the nonaqueous electrolyte secondary batteries E to H of the Comparative Examples. Below, the nonaqueous electrolyte secondary batteries E to H of the Comparative Examples are analyzed, and then, the nonaqueous electrolyte secondary batteries A to D and K of the Examples are analyzed.

The nonaqueous electrolyte secondary battery F of Comparative Example 2 includes the structure retainer in the active material layer of the negative electrode and therefore achieved a greater number of cycles than the nonaqueous electrolyte secondary battery E (Comparative Example 1). However, the effect (the rate of improvement in number of cycles) was relatively small as compared with the nonaqueous electrolyte secondary batteries A to D and K of the Examples. Similarly, the nonaqueous electrolyte secondary battery G of Comparative Example 3 includes the structure retainer in the mixture layer of the positive electrode, and the nonaqueous electrolyte secondary battery H of Comparative Example 4 includes the structure retainer in the porous insulating layer. Therefore, the battery G and the battery H achieved greater numbers of cycles than the nonaqueous electrolyte secondary battery E. However, the effect of improvement was relatively small as compared with the nonaqueous electrolyte secondary batteries A to D and K of the Examples. A conceivable reason for this is that, when the nonaqueous electrolyte secondary battery is charged/discharged, the active material of the positive electrode and the porous insulating layer do not expand or contract, or do not substantially expand or contract, while the active material of the negative electrode expands or contracts more than the active material of the positive electrode and the porous insulating layer do.

Conceivable reasons why the nonaqueous electrolyte secondary batteries E to H achieved smaller numbers of cycles are described below.

In the nonaqueous electrolyte secondary battery E, when the active material of the negative electrode expands, the positive electrode and the separator are compressed, so that the voids of the positive electrode and the separator collapse. As a result, the nonaqueous electrolyte solution is expelled out of the voids.

In the nonaqueous electrolyte secondary battery F, the structure retainer prevents expansion of the active material of the negative electrode, but it is difficult to sufficiently prevent the expansion of the active material of the negative electrode. Therefore, when the active material of the negative electrode expands, the positive electrode and the separator are compressed. As a result, the nonaqueous electrolyte solution is expelled out of the mixture layer of the positive electrode and the separator.

In the nonaqueous electrolyte secondary battery G, the structure retainer is included in the mixture layer of the positive electrode. However, when the active material of the negative electrode expands, the separator is compressed so that the nonaqueous electrolyte solution is expelled out of the separator.

The nonaqueous electrolyte secondary battery H includes the porous insulating layer instead of the separator, and the porous insulating layer includes the structure retainer. However, the structure retainer is not included in the mixture layer of the positive electrode. Therefore, when the active material of the negative electrode expands, the positive electrode is compressed. As a result, the nonaqueous electrolyte solution is expelled out of the mixture layer of the positive electrode.

On the other hand, the nonaqueous electrolyte secondary batteries A to D and K of the Examples include the structure retainer in both the mixture layer of the positive electrode and the porous insulating layer. Therefore, even when the active material of the negative electrode is stimulated to expand, the structure retainer prevents expansion of the active material of the negative electrode (especially, expansion of the active material of the negative electrode in the thickness direction of the active material layer of the negative electrode). Thus, the nonaqueous electrolyte solution is prevented form being expelled out of the mixture layer of the positive electrode, the porous insulating layer, and the active material layer of the negative electrode. Accordingly, the number of cycles can be increased, and the cycle characteristics can be improved.

Comparing the nonaqueous electrolyte secondary battery A of Example 1 and the nonaqueous electrolyte secondary battery D of Example 4, the battery A in which the ceramic granules in the shape of twigs were used as the structure retainer achieved a greater number of cycles than the battery D in which the ceramic granules were spherical. A conceivable reason for this is that the ceramic granules in the shape of twigs are more likely to be entangled with one another than the spherical ceramic granules and therefore improves the strength of the structure retainer.

Comparing the nonaqueous electrolyte secondary battery I of Example 5 and the nonaqueous electrolyte secondary battery J of Comparative Example 5, the nonaqueous electrolyte secondary battery I achieved a greater number of cycles than the nonaqueous electrolyte secondary battery J. The capacity is larger but the expansion rate is higher when an alloy or metal oxide is used as the active material of the negative electrode than when carbon is used as the active material of the negative electrode. Thus, when the separator made of a polyethylene resin is used instead of the porous insulating layer as in the nonaqueous electrolyte secondary battery J, the number of cycles greatly decreases. On the other hand, the nonaqueous electrolyte secondary battery I includes the structure retainer in both the mixture layer of the positive electrode and the porous insulating layer. Therefore, even when the active material of the negative electrode expands, the structure retainer prevents expansion of the positive electrode and the porous insulating layer. Thus, the nonaqueous electrolyte solution is prevented from being expelled out of the mixture layer of the positive electrode, the porous insulating layer, or the active material layer of the negative electrode, so that the number of cycles increases.

Thus, by employing the structures of Examples 1 to 6, nonaqueous electrolyte secondary batteries having excellent cycle characteristics can be provided.

What is claimed is:

1. A nonaqueous electrolyte secondary battery, comprising:
    a positive electrode having a mixture layer which contains an active material in which lithium ions are electrochemically intercalatable and deintercalatable;
    a negative electrode having a layer which contains an active material in which lithium ions are electrochemically intercalatable and deintercalatable;
    a porous insulating layer interposed between the positive electrode and the negative electrode; and
    nonaqueous electrolyte contained at least in the porous insulating layer,
    wherein the mixture layer of the positive electrode includes a first compression-resistant component for preventing the mixture layer of the positive electrode from being compressed due to expansion of the active material of the negative electrode in a thickness direction of the layer of the negative electrode,
    the porous insulating layer includes a second compression-resistant component, or is made of the second compression-resistant component, the second compression-resistant component preventing the porous insulating layer from being compressed due to expansion of the active material of the negative electrode in the thickness direction of the layer of the negative electrode, and
    the first compression-resistant component is ceramic granules or carbon fiber, and the second compression-resistant component is ceramic granules.

2. The nonaqueous electrolyte secondary battery of claim 1, wherein the ceramic granules of the second-resistant component have the shape of twigs.

3. The nonaqueous electrolyte secondary battery of claim 1, wherein the layer of the negative electrode includes an expansion-resistant component for preventing the active material of the negative electrode from being expanded, and the expansion-resistant component is carbon fiber.

* * * * *